(12) United States Patent
Chen

(10) Patent No.: US 7,042,592 B2
(45) Date of Patent: May 9, 2006

(54) METHOD AND APPARATUS FOR AUTOMATIC ADJUSTMENT OF PRINTER

(75) Inventor: Jerry Chen, Taoyuan (TW)

(73) Assignee: Lite-On Technology Corporation, Taipei (TW)

( * ) Notice: Subject to any disclaimer, the term of this patent is extended or adjusted under 35 U.S.C. 154(b) by 1081 days.

(21) Appl. No.: 09/731,958

(22) Filed: Dec. 7, 2000

(65) Prior Publication Data

US 2002/0114008 A1 Aug. 22, 2002

(51) Int. Cl.
*G06F 15/00* (2006.01)
*B41J 29/393* (2006.01)

(52) U.S. Cl. .......................... 358/1.9; 358/1.9; 347/19

(58) Field of Classification Search ............... 358/1.18, 358/1.3, 1.2, 1.1, 1.9, 3.1, 504; 347/42, 3, 347/32, 8, 19, 43; 399/39, 67; 101/485, 101/484; 400/611, 613
See application file for complete search history.

(56) References Cited

U.S. PATENT DOCUMENTS

| | | | | |
|---|---|---|---|---|
| 4,779,106 | A * | 10/1988 | Mills | 347/129 |
| 5,534,895 | A * | 7/1996 | Lindenfelser et al. | 347/19 |
| 5,809,366 | A * | 9/1998 | Yamakawa et al. | 399/39 |
| 6,010,205 | A * | 1/2000 | Billet | 347/40 |
| 6,118,950 | A * | 9/2000 | Wibbels et al. | 399/16 |
| 6,158,344 | A * | 12/2000 | Walker et al. | 101/484 |
| 6,297,888 | B1 * | 10/2001 | Noyes et al. | 358/1.9 |
| 6,549,295 | B1 * | 4/2003 | Fantone et al. | 358/1.14 |
| 6,554,398 | B1 * | 4/2003 | Wyngaert et al. | 347/42 |
| 6,563,603 | B1 * | 5/2003 | Yamazaki | 358/1.9 |

\* cited by examiner

*Primary Examiner*—Kimberly Williams
*Assistant Examiner*—Saeid Ebrahimi-Dehkordy
(74) *Attorney, Agent, or Firm*—Rosenberg, Klein & Lee

(57) ABSTRACT

A method for automatic adjustment of a printer, which is adapted to be implemented on a system having a printing part and a scanning part. The method includes steps of: printing an original preset in the system, scanning said original by the scanning part to obtain a digital image data of the original, obtaining an adjusting parameter by referring to the digital image data, and using the adjusting parameter to adjust the printing part for achieving the automatic adjustment.

7 Claims, 4 Drawing Sheets

METHOD AND APPARATUS FOR AUTOMATIC ADJUSTMENT OF PRINTER

FIELD OF THE INVENTION

The present invention relates to a method and an apparatus for automatic adjustment of a printer, and more especially to a method and an apparatus for automatic adjustment implemented on a system having a printing part and a scanning part.

BACKGROUND OF THE INVENTION

Along with the fast development on the personal computer industry, different accessory products of the computer renew quickly. Among the accessory products, the printer and the scanner gradually become the basic equipment for the computer. Furthermore, a multifunctional machine integrated a printer with a scanner is more popular for using in the personal studio and the mini-office.

The printer, especially for ink jet printer, has to process an alignment action to achieve the alignment of the printer. At present, the alignment action includes steps of printing an original for alignment as shown in FIG. 1 by the printer, observing the original by the user's eyes, selecting a preferred adjusting parameter (the preferred parameter is 4 in FIG. 1), and inputting the preferred adjusting parameter into the computer to change the printing parameter. Because the alignment action need employ the observation and input by the user, the traditional adjusting method has the disadvantages of inconvenient operation and unstable adjusting quality. Therefore, the purpose of the present invention is to develop a method having the properties of easy operation, stable quality, fast, and assurance is.

It is therefore tried by the applicant to deal with the above situations encountered in the prior art.

SUMMARY OF THE INVENTION

It is therefore an object of the present invention to propose a method for automatic adjustment of a printer to avoid the unstable printing quality resulted from the users' judgment.

It is therefore another object of the present invention to propose a method for automatic adjustment of a printer to achieve a convenient, fast, and reliable operation.

According to the present invention, the method for automatic adjustment of a printer, which is adapted to be implemented on a system having a printing part and a scanning part. The method comprises steps of: (a) printing an original preset in the system, (b) scanning the original by the scanning part to obtain a digital image data of the original, (c) obtaining an adjusting parameter by referring to the digital image data, and (d) using the adjusting parameter to adjust the printing part for achieving the automatic adjustment.

Certainly, the original can be an alignment reference having plural reference marks and plural alignment lines. The plural reference marks are preferably plural positioning points.

Preferably, the step (c) comprises steps of: (c1) defining an alignment region having the plural alignment lines according to the plural reference marks, (c2) obtaining plural regression straight lines corresponding to the plural alignment lines respectively, and (c3) finding one of the regression straight line having the most coincidence with the corresponding one of the plural alignment lines to obtain the adjusting parameter. The step (c3) comprises defining coordinate values of the plural reference marks, calculating an slope of a line constructed by two of the coordinate values of the reference marks, and finding the alignment region for adjustment according to the slope.

According to another aspect of the present invention, a method for automatic adjustment of a printer is provided, wherein the printer is electrically connected to a processor and the processor is further electrically connected to a scanner. The method comprises steps of: printing an original preset in the processor by the printer, scanning the original by the scanner to obtain a digital image data of the original, obtaining an adjusting parameter by the processor according to the digital image data, and using the adjusting parameter by the processor to adjust the printer for achieving the automatic adjustment.

Certainly, the processor can be a computer device.

Certainly, the processor can be selected from a group consisting of a personal computer, a notebook, a personal digital assistant, and a mobile phone.

According to an additional aspect of the present invention, there is provided an apparatus of automatic adjustment which comprises a printing part for printing an original preset in the apparatus, a scanning part for scanning the original to obtain a digital image data of the original, and a processing part for obtaining an adjusting parameter by referring to the digital image data to adjust the printing part for achieving the automatic adjustment.

Certainly, the printing part can be a printer.

Certainly, the scanning part can be a scanner.

According to a further aspect of the present invention, there is provided a recording medium storing a program for executing a method for automatic adjustment. The method comprises steps of: printing an original preset in the system, scanning by the scanning part the original to obtain a digital image data of the original, obtaining an adjusting parameter by referring to the digital image data, and using the adjusting parameter to adjust the printing part for achieving the automatic adjustment.

The present invention may best be understand through the following description with reference to the accompanying drawings, in which:

DETAILED DESCRIPTION OF THE PREFERRED EMBODIMENT

Figure 1:
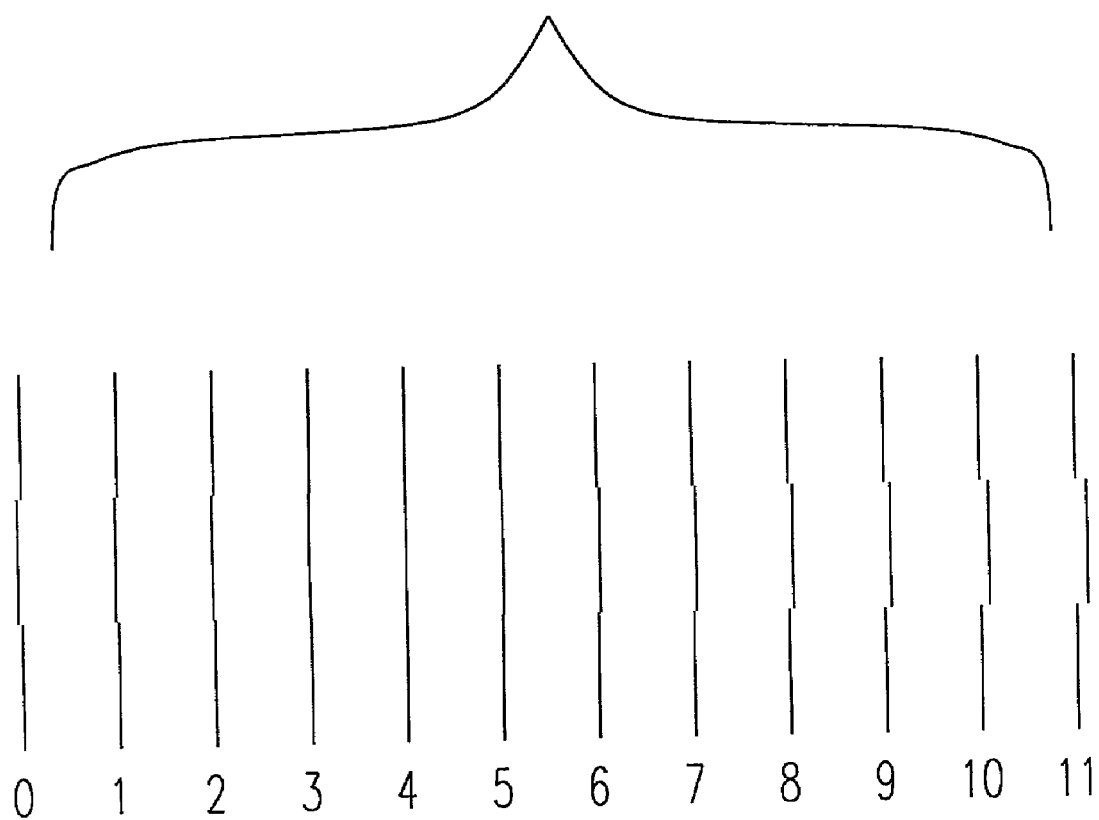
FIG. 1 is an example diagram illustrating an original for alignment, wherein the original is printed using a method according to the prior art.
Figure 2:
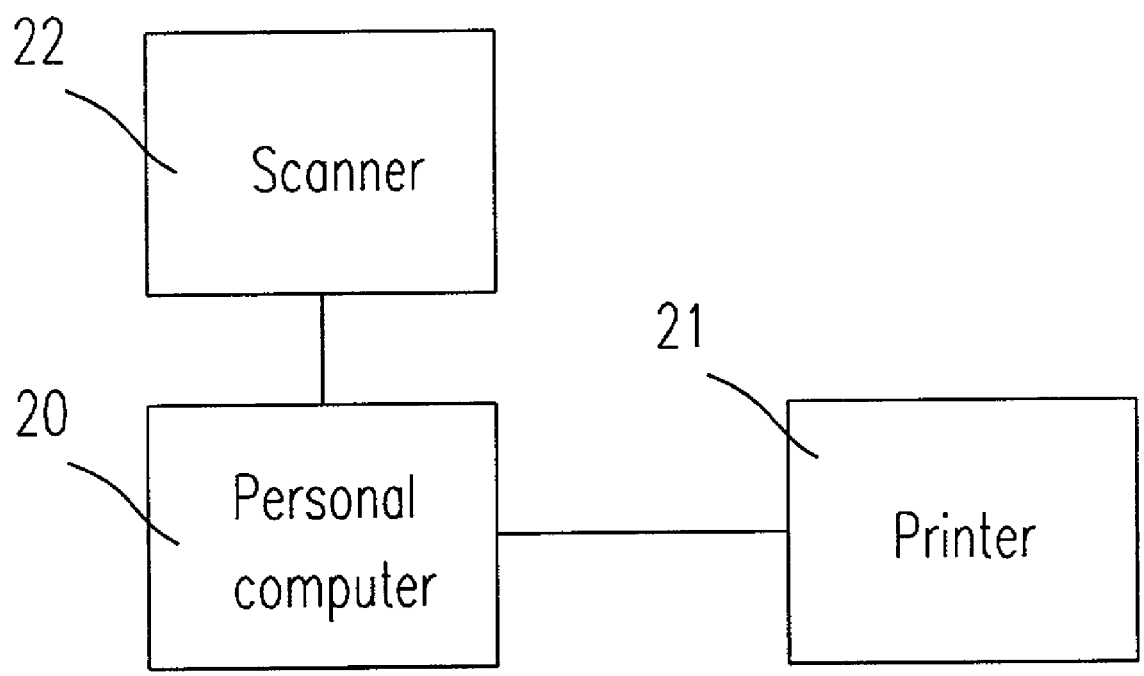
FIG. 2 is a block diagrams illustrating the hardware used in the method for automatic adjustment of a printer according to the present invention.

FIG. 2 is a block diagram illustrating the hardware used in the method for automatic adjustment of a printer according to the present invention. The printer 21 is electrically connected to a processor 20, e.g. a personal computer, and the processor 20 is electrically connected to a scanner 22.

Figure 3:
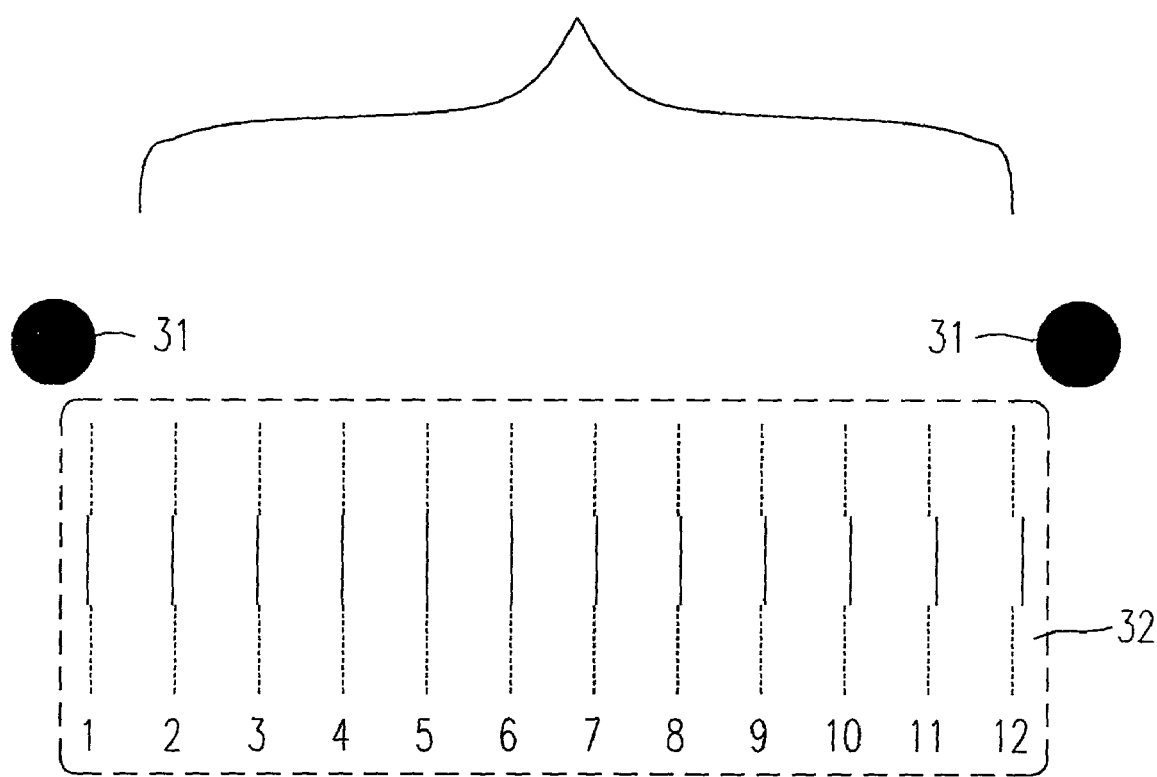
FIG. 3 is an example diagram illustrating an original for alignment by using a method according to the present invention.

The method of the present invention includes the following steps:

(a) printing an original by the printer 21, wherein the original is used for alignment and has plural positioning points 31 and plural alignment lines as shown in FIG. 3;

(b) scanning the original by the scanner 22 to obtain a digital image data of the original;

(c) obtaining an adjusting parameter by the processor 20, for example a personal computer, according to the digital image data of the original, wherein the step (c) includes: (c1) according to the coordinate values of any two of the plural positioning points 31, (x1, y1) and (x2, y2), to calculate a slope q=(x2−x1)/(y2−y1), and according to the slope q for defining an alignment region including the plural alignment lines 32, (c2) respectively calculating the plural alignment lines 32 to find the plural regression straight lines corresponding to the plural alignment lines 32, and (c3) finding one of the regression straight lines having the most coincidence with the corresponding plural alignment lines to obtain an adjusting parameter; and (d) using the adjusting parameter by the processor 20 to adjust the printer 21 for achieving the automatic adjustment of the printer 21.

The calculation procedures of the steps (c2) and (c3) are shown as follows:

using equation (1) to calculate and find the average value of background gray scale of the pixel, P, in the alignment region;

using equation (2) to obtain the standard deviation of background gray scale of the pixel in the alignment region;

using equation (3) to obtain a threshold value T;

finding the pixels Pi in the alignment region whose gray scale is smaller than the threshold value T and the regression straight lines of the pixels Pi as shown in equation (4); and using equation (5) to find the coincidence of the regression straight lines, determined by $R^2$, and the corresponding alignment lines, and further automatically selecting a regression straight line having the largest $R^2$.

$$\overline{P} = \sum_{i=1}^{n} P_i / n \qquad \text{Equation (1)}$$

$$S_P = \sqrt{\sum_{i=1}^{n} (P_i - \overline{P})^2 / n - 1} \qquad \text{Equation (2)}$$

$$\hat{Y} = \hat{a} + \hat{b}X \text{ wherein } \hat{a} = \overline{y} - \hat{b}\overline{x} \qquad \text{Equation (3)}$$

$$\hat{b} = \frac{\sum_{i=1}^{n} (x_i - \overline{x})(y_i - \overline{y})}{\sum_{i=1}^{n} (x_i - \overline{x})^2}$$

$$T = \overline{P} - 3S_p \qquad \text{Equation (4)}$$

$$R^2 = 1 - \frac{\sum_{i=1}^{n} (y_i - \hat{y}_i)^2}{\sum_{i=1}^{n} (y_i - \overline{y})^2} \qquad \text{Equation (5)}$$

In sum, by using the method for automatic adjustment of a printer according to the present invention, it is not necessary to observe an original, decide the parameter and input the parameter by users. Therefore, the goal of the present invention is achieved by overcoming the defects of inconvenient operation and unstable adjusting quality. Furthermore, the method for automatic adjustment of the printer according to the present invention has the advantages of reliable operation, improved quality, and assurance.

Figure 4:
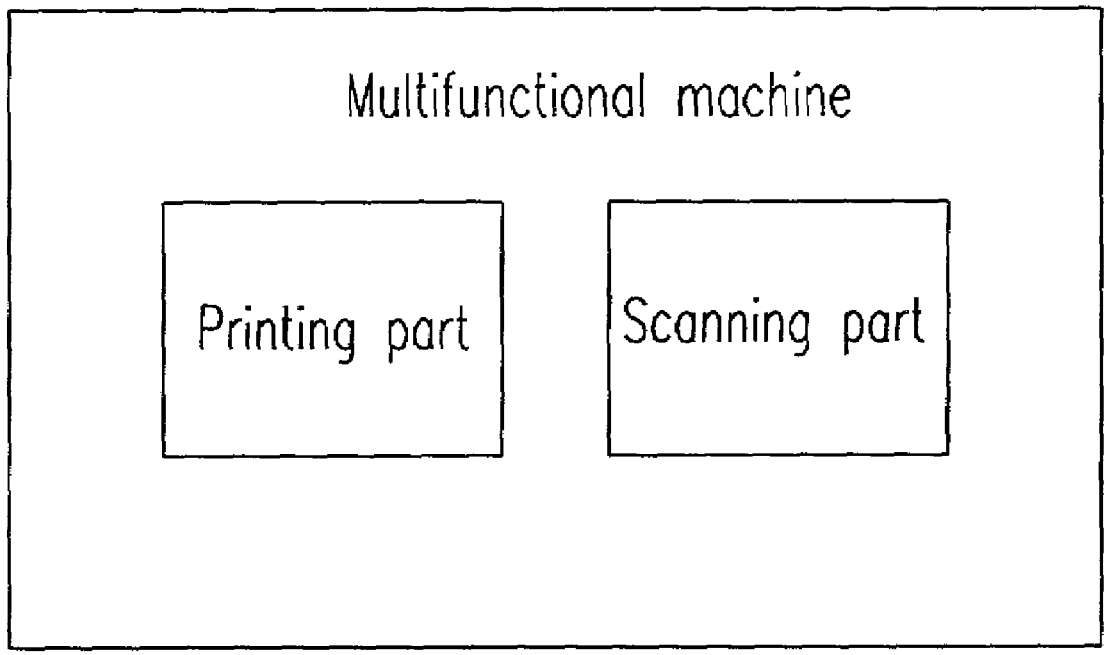
FIG. 4 is a function block diagram illustrating a multifunctional machine integrated with printing and scanning parts.

In addition, as shown in FIG. 4, the method described above is also applied to a machine integrated a printer with a scanner.

While the invention has been described in terms of what are presently considered to be the most practical and preferred embodiments, it is to be understood that the invention need not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for automatic printing alignment implemented in a system including a printing part and a scanning part, comprising the steps of:

(a) printing an original preset in said system, said original being an alignment reference having a plurality of reference marks and a plurality of alignment lines;

(b) scanning said original by said scanning part to obtain a digital image data of said original, said digital image data including data corresponding to said plurality of the alignment lines;

(c) obtaining an adjusting parameter by processing said data corresponding to said plurality of the alignment lines in said digital image data; and (d) using said adjusting parameter to responsively adjust said printing part for achieving said automatic printing alignment.

2. The method according to claim 1, wherein said plural reference marks are plural positioning points.

3. A method for automatic adjustment, which is adapted to be implemented on a system having a printing part and a scanning part, comprising the steps of:

(a) printing an original preset in said system;

(b) scanning said original by said scanning part to obtain a digital image data of said original;

(c) obtaining an adjusting parameter by referring to said digital image data, and by steps including:

(c1) defining an alignment region having said plural alignment lines according to said plural reference marks;

(c2) obtaining plural regression straight lines corresponding to said plural alignment lines respectively; and (c3) finding one of said regression straight line having the most coincidence with the corresponding one of said plural alignment lines to obtain said adjusting parameter; and, (d) using said adjusting parameter to adjust said printing part for achieving said automatic adjustment.

4. The method according to claim 3, wherein said step (c3) comprises defining coordinate values of said plural reference marks, calculating an slope of a line constructed by two of said coordinate values of said reference marks, and finding said alignment region for adjustment according to said slope.

5. A method for automatic alignment of a printer, wherein said printer is electrically connected to a processor electrically connected to a scanner, comprising steps of:

printing an original preset in said processor by said printer, said original being an alignment reference having a plurality of reference marks and a plurality of alignment lines;

scanning said original by said scanner to obtain a digital image data of said original, said digital image data including data corresponding to said plurality of the alignment lines;

obtaining an adjusting parameter by processing said data corresponding to said plurality of the alignment lines by said processor according to said digital image data; and using said adjusting parameter by said processor to responsively adjust said printer for achieving said automatic printer alignment.

6. The method according to claim 5, wherein said processor is a computer device.

7. The method according to claim 6, wherein said processor is selected from a group consisting of a personal computer, a notebook, a personal digital assistant, and a mobile phone.

* * * * *